United States Patent [19]
Braun

[11] Patent Number: 5,221,839
[45] Date of Patent: Jun. 22, 1993

[54] DOUBLE BEVEL GRADIENT-INDEX ROD LENS OPTICAL RECEIVER HAVING HIGH OPTICAL RETURN LOSS

[75] Inventor: David M. Braun, Santa Rosa, Calif.

[73] Assignee: Hewlett-Packard Company, Palo Alto, Calif.

[21] Appl. No.: 656,884

[22] Filed: Feb. 15, 1991

[51] Int. Cl.⁵ .................................................. G02B 6/00
[52] U.S. Cl. ......................... 250/227.24; 250/227.24; 359/652; 385/34
[58] Field of Search .............................. 385/31, 33, 34; 359/652, 653, 654, 655; 250/227.24, 227.29

[56] References Cited

U.S. PATENT DOCUMENTS 4,331,380 5/1982 Rees et al. ........................... 359/652

Primary Examiner—Carolyn E. Fields
Attorney, Agent, or Firm—William C. Milks, III

[57] ABSTRACT

A gradient-index (GRIN) rod lens for use in an optical receiver, in which the end face of the GRIN rod lens opposite a photodetector is bevelled. The resulting optical receiver achieves an optical return loss which is >10 dB higher than known optical receivers having a bevelled end solely on an optical launch side of the GRIN rod lens.

18 Claims, 4 Drawing Sheets

DOUBLE BEVEL GRADIENT-INDEX ROD LENS OPTICAL RECEIVER HAVING HIGH OPTICAL RETURN LOSS

BACKGROUND OF THE INVENTION

This invention relates to test and measurement instruments and, more particularly, to methods and apparatus for receiving an optical signal and transmitting the received optical signal to an optoelectrical transducer for photodetection. Specifically, the invention is directed to a gradient-index (GRIN) rod lens connected in an optical circuit between an optical launch, such as a fiber optic cable, and a photodetector for efficiently coupling light received through the optical fiber to the photodetector.

Optical return loss (ORL) is defined by:

$$ORL = 10 \cdot \log (P_i/P_r) \; (dB) \qquad \text{Eq. (1)}$$

where $P_i$ is the incident optical power and $P_r$ is the reflected optical power. In an optical receiver, high ORL is desirable for various reasons.

For example, high ORL is desirable in an optical receiver to avoid perturbing active optical components, such as distributed feedback lasers used as optical sources. Agrawal, G. P., and Dutta, N. K., *Long Wavelength Semiconductor Lasers*, (Van Nostrand Reinhold, New York, 1986); Tkach, R. W., and Chraplyvy, A. R., "Linewidth broadening and mode splitting due to weak feedback in single-frequency 1.5 μm lasers," Elect. Lett. 21, 1081–1083 (1985). High ORL is also desirable to reduce measurement mismatch uncertainty when the optical receiver is used in a lightwave component measurement system that measures modulation bandwidth.

One known optical receiver comprises a single-mode optical fiber, a GRIN rod lens, and a photodetector connected in an optical circuit. For example, the GRIN rod lens can be a 0.2 to 0.3 pitch GRIN rod lens in a 1:1 or magnified imaging position with respect to the photodetector. In this known optical receiver, optical reflections can occur at the optical fiber end face, both faces of the GRIN rod lens, and the face of the photodetector.

To achieve a high ORL, reflections from these faces must either be minimized or deflected away from the optical return path through the optical fiber. Specular reflections from the optical fiber end face are conventionally deflected away from the optical return path. Marcuse, D., "Reflection losses from imperfectly broken fiber ends," *Appl. Opt.* 14, 3016–3020 (1975); Ulrich, R., and Rashleigh, S. C., "Beam-to-fiber coupling with low standing wave ratio," Appl. Opt. 19, 2453–2456 (1980). Such reflections from the lens entrance face are also traditionally deflected away from the optical return path. von Bally, G., Schmidthaus, W., Sakowski, H., and Mette, W., "Gradient-index optical systems in holographic endoscopy," Appl. Opt. 23, 1725–1729 (1984). Specular reflections from the face of the photodetector are also commonly deflected away from the optical return path. This is typically achieved by appropriately bevelling the optical fiber end face, as well as the lens entrance face and, additionally, by tilting the photodetector with respect to normal incidence on the face of the photodetector.

Furthermore, reflections from the lens exit face are typically minimized with an anti-reflection (AR) coating. However, one drawback is that the ORL bandwidth of the optical receiver is undesirably limited by the AR coating bandwidth.

It is therefore desirable to increase the optical return loss of an optical receiver. Furthermore, it is desirable to achieve higher optical return loss across a wide range of wavelengths.

SUMMARY OF THE INVENTION

One embodiment of the present invention provides a gradient-index (GRIN) rod lens for use in an optical receiver, in which not only an end face of the GRIN rod lens opposite an optical launch is bevelled, but an end face of the GRIN rod lens opposite a photodetector is also bevelled. Surprisingly, the resulting optical receiver achieves an optical return loss (ORL) which is >10 dB higher than known optical receivers having a bevelled end face solely on the optical launch side of the GRIN rod lens.

In accordance with the invention, a double bevel GRIN rod lens is interposed between the optical launch, such as an optical fiber, and a photodetector, such as a photodiode, to form an optical receiver having an improved ORL. Preferably, the optical receiver comprises a single-mode optical fiber, a GRIN rod lens having both a bevelled entrance face and a bevelled exit face, and an $In_{0.53}Ga_{0.47}As/InP$ p-i-n photodiode detector. In this Optical receiver structure, optical reflections back toward the optical return path are optimally reduced at the optical fiber end face, both faces of the GRIN rod lens, and the face of the photodetector to achieve a higher ORL than in conventional optical receivers.

Measurements evidence that a GRIN rod lens with bevelled end faces achieved a broadband optical return loss >87 dB. Measurements also ascertained that the ORL for an optical receiver incorporating such a GRIN rod lens having a bevelled exit face was >65 dB and that the overall optical receiver ORL was limited by the diffuse reflection from the photodetector, rather than by specular reflections from the exit face of the GRIN rod lens. Furthermore, a pigtailed packaged 20 GHz optical receiver comprising a GRIN rod lens having a bevelled exit face as well as a bevelled entrance face achieved 57.6 dB ORL at $\lambda = 1300$ nm and >65 dB ORL at $\lambda = 1550$ nm. Such an optical receiver can advantageously be . incorporated into an HP 83411A or HP 83410B lightwave receiver available from Hewlett-Packard Company, Palo Alto, California, or serve as a high-speed optical receiver to provide an optical front end for a Hewlett Packard Company Hp 54121, Hp 54123, or HP 54124 digital oscilloscope.

BRIEF DESCRIPTION OF THE DRAWINGS

The above and other features of the invention and the concomitant advantages will be better understood and appreciated by persons skilled in the field to which the invention pertains in view of the following description given in conjunction with the accompanying drawings. In the drawings.

DETAILED DESCRIPTION OF THE PREFERRED EMBODIMENT

One embodiment of the present invention provides a gradient-index (GRIN) rod lens having both a bevelled entrance face and a bevelled exit face for use in an optical receiver for high optical return loss (ORL). One embodiment of the GRIN rod lens in accordance with the invention, generally indicated by the numeral 10, is shown in FIG. 1.

Figure 1:
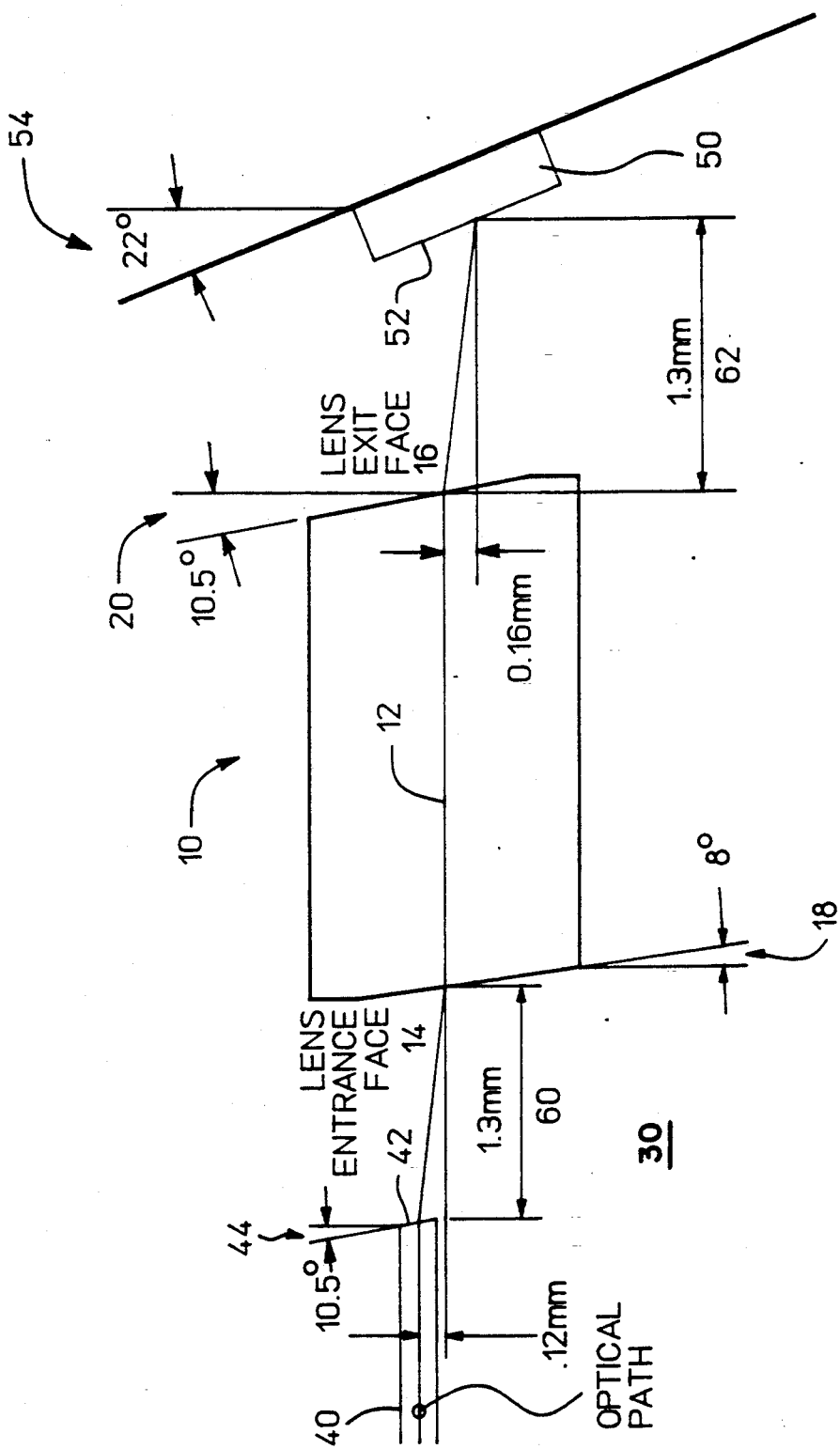
FIG. 1 is a cross-sectional schematic view of an optical receiver which incorporates a gradient-index (GRIN) rod lens having a bevelled exit face in accordance with one embodiment of the invention.

With reference to FIG. 1, the GRIN rod lens 10 is generally oriented along an optical axis 12. For example, the GRIN rod lens 10 can be a SELFOC (registered trademark of Nippon Sheet Glass Co., Ltd., Tokyo, Japan) microlens, type H, refractive index no ($\lambda=1300$ nm)$=1.636$, $n_0$ ($\lambda=1550$ nm)$=1.634$, diameter 1.8 mm, and 0.27 pitch at 1300 nm. The GRIN rod lens 10 comprises an entrance face 14 and an exit face 16 aligned along the optical axis 12.

As shown in FIG. 1, the entrance face 14 of the GRIN rod lens 10 is bevelled at a first predetermined angle 18 with respect to the optical axis 12. The exit face 16 of the GRIN rod lens 10 is bevelled at a second predetermined angle 20 with respect to the optical axis 12. Preferably, the first predetermined angle 18 and the second predetermined angle 20 are different angles, as shown in FIG. 1. For example, the first predetermined angle 18 can be approximately 8°, and the second predetermined angle 20 can be approximately 10.5°. The bevel of 10.5° is such that the measured reflection from the exit face 16 of the GRIN rod lens 10 is due only to diffuse reflection and not to specular reflection.

As shown in FIG. the GRIN rod lens 10 can be incorporated into an optical receiver 30. The optical receiver 30 additionally comprises an optical launch 40 in the form of an optical fiber. For example, the optical fiber 40 can be a single mode fiber optic cable having a 9-$\mu$m core. The optical fiber 40 has an end face 42 which is bevelled at a third predetermined angle 44 with respect to the optical axis 12. For example, the third predetermined angle can be 10.5° and is therefore a corresponding angle with the second predetermined angle 20. The third predetermined angle 44 of bevel for the end face 42 of the optical fiber 40 and the first predetermined angle 18 of the bevel of the entrance face 14 of the GRIN rod lens 10 are such that with the optical fiber and GRIN rod lens geometric center axes parallel, a 0.12 mm lateral offset provides an on-axis optical path through the lens, as shown in FIG. 1.

The optical receiver 30 also comprises a photodetector 50. For example, the photodetector 50 can comprise a frontside illuminated, 60-$\lambda$m large diameter $In_{0.53}Ga_{0.47}As/InP$ p-i-n photodiode detector. The photodetector 50 has a receiving surface 52. As shown in FIG. 1 the photodetector 50 is tilted at a fourth predetermined angle 54 with respect to normal incidence. For example, the fourth predetermined angle 54 can be approximately 22°.

As shown in FIG. 1, the end face 42 of the optical fiber 40 is spaced by a first air gap 60 from the entrance face 14 of the GRIN rod lens 10. Also, the receiving surface 52 of the photodetector 50 is spaced by a second air gap 62 from the exit face 16 of the GRIN rod lens 10. For example, in one implementation of the optical receiver 30 shown in FIG. 1, the air gaps 60 and 62 can be approximately 1.3 mm each. That is, the GRIN rod lens 10 is spaced equidistantly between the optical fiber 40 and the photodetector 50 and separated by the air gaps 60 and 62, respectively. The actual working distance needed for the GRIN rod lens 10 to properly focus light received from the optical fiber 40 onto the receiving surface 52 of the photodetector 50 can be adjusted by varying the second air gap 62. The optical receiver 30 can be assembled on an optical table with mechanical holders and x-y-z positioners.

The receiving surface 52 of the photodetector 50 is preferably coated with an anti-reflection (AR) coating to reduce reflections at the interface of the air gap 62 and the receiving surface 52 of the photodetector 50. For example, the AR coating can be a silicon nitride AR coating, as described in Braun, D. M., "Design of single layer antireflection coatings for $InP/In_{0.53}Ga_{0.47}As/InP$ photodetectors for the 1200–1600nm wavelength range," Appl. Opt. 27, 2006–2011 (1988). The reflectance of this AR coating has been measured at normal incidence to be 0.4% at $\lambda = 1300$ nm and 1.3% at $\lambda = 1550$ nm employing the measurement technique described in Braun, D. M., and Leyde, K. W., "Optical reflection measurement system using a swept modulation frequency technique," Opt. Eng. 28, 286–289 (1989).

ORL was then measured using an optical continuous wave reflectometry technique. Measurements were performed at $\lambda = 1300$ nm and at $\lambda = 1550$ nm both with and without the photodetector 50 present.

Figure 2:
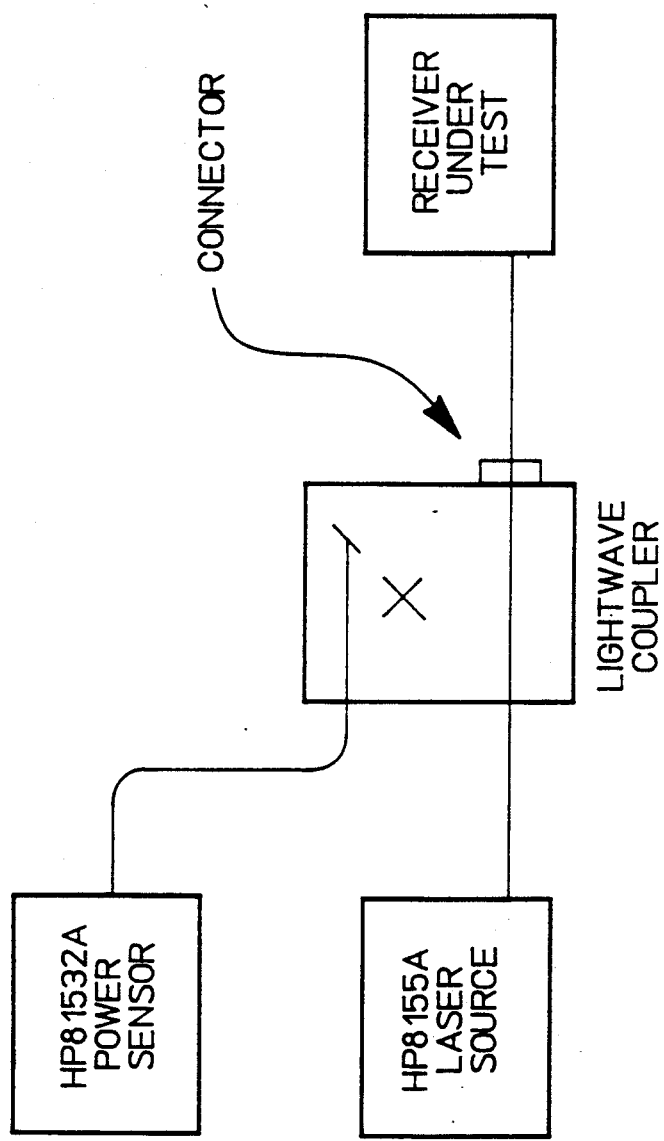
FIG. 2 is a block diagram of an optical continuous-wave reflection measurement system used to perform optical return loss (ORL) measurements on the GRIN rod lens and the optical receiver shown in FIG. 1.

Considered in more detail, a block diagram of an optical continuous wave reflectometer measurement system is shown in FIG. 2. This system was calibrated with an optical-fiber-to-air reference interface whose reflectance was calculated to be $-14.7$ dB. Lightwave coupler isolation and reflection from a connector pair on the coupler output port was measured using a patchcord having a 10.5° bevelled optical fiber end face. This signal level was then subtracted from the levels measured from each GRIN rod lens or optical receiver under test to yield an absolute ORL. By using connectors having an ORL of 63 dB and a lightwave coupler having an isolation of $-50$ dB, the optical continuous wave reflectometer measurement system shown in FIG. 2 attained an ORL upper measurement limit of 70 dB and a measurement accuracy of $\pm 2$ dB.

Measurements were performed on various structures to compare the ORL performance of GRIN rod lenses and optical receivers having non-bevelled and bevelled, and with non-AR coated and AR coated, lens exit faces on the GRIN rod lens. GRIN rod lenses with the following five lens exit face configurations were evaluated by interchanging the lenses: A) unbevelled lens exit face, but AR coated for a single minimum at $\lambda = 1300$ nm; B) unbevelled lens exit face, but AR coated for a double minimum at $\lambda = 1300$ nm and $\lambda = 1550$ nm; C) bevelled lens exit face 16 in accordance with the embodiment of the invention shown in FIG. 1, but not AR coated; D) bevelled lens exit face 16 in accordance with the embodiment of the invention shown in FIG. 1 and AR coated for a double minimum at $\lambda = 1300$ nm and $\lambda = 1550$ nm; and E) unbevelled lens exit face and not AR coated. The bevelled lens entrance face of the GRIN rod lens was AR coated for all configurations except for configurations C and E to reduce specular reflections and improve optical transmission. Measurements of the ORL for all configurations, both with and without the photodetector present, are given in Table I.

TABLE I

Optical Return Loss of Receivers with Lens Designs A-E

| Design | λ = 1300 nm | | λ = 1550 nm | |
|---|---|---|---|---|
| | Lens only | with PD | Lens only | with PD |
| A | 57.4 | 57.2 | 40.8 | 40.8 dB |
| B | 47.2 | 47.2 | 53.4 | 53.2 dB |
| C | >70.0 | 68.0 | >70.0 | 67.7 dB |
| D | >70.0 | 66.9 | >70.0 | 68.0 dB |
| E | 34.4 | 34.4 | 34.1 | 34.1 dB |

PD means photodetector.

The best ORL from an AR coated unbevelled lens exit face configuration was 57.4 dB at 1300 nm. The reflection from this lens exit face limited the optical receiver ORL to 57.2 dB. The ORL from a bevelled lens exit face configuration was >70 dB at both $\lambda = 1300$ nm and 1550 nm and has been measured with another optical component analyzer to be approximately 87 dB. Therefore, by bevelling the lens exit face of the GRIN rod lens in accordance with the invention, an almost 20 dB ORL improvement was achieved over the AR coated unbevelled lens exit face configurations.

As seen in Table I, the ORL for optical receivers incorporating the unbevelled lens exit face configurations (A, B, and E) was limited by the reflection from the unbevelled lens exit face of the GRIN rod lens. In contrast, for optical receivers incorporating the bevelled lens exit face configurations (C and D), the ORL was limited by the smaller diffuse reflection from the photodetector to an average of approximately 68 dB.

In summary, optical receivers using a GRIN rod lens with double bevel faces achieved a broadband ORL >65 dB. The overall optical receiver ORL was limited by the diffuse reflection from the receiving surface 5 of the photodetector 50, rather than by specular reflections from the bevelled lens exit face.

In these ORL measurements, the optical path in the GRIN rod lens was on-axis, which for the unbevelled lens exit face configurations is the worst case path for ORL.

By shifting the optical fiber 40 laterally 0.1 mm or more, the reflection from the lens exit face will be deflected away from the optical return path, and >70 dB ORL performance can be achieved. But now the optical path is not on-axis, and some degradation of the focused spot on the receiving surface 52 of the photodetector 50 will be experienced due to lens aberrations. Also, the optical alignment of an optical receiver will be more difficult, since optimum position of the optical fiber launch lies in an annular ring, as compared to the area within a circle.

Additionally, the reflectances of the AR coatings used in configurations A, B, and D were calculated from the ORL measurement of the GRIN rod lens having configuration E. Assuming that the uncoated lens exit face reflectance can simply be calculated using no, then the excess loss of the optical receiver is:

$$loss = ORL_{un} + 20*\log((n_0-1)/(n_0+1))\ (dB) \qquad \text{Eq. (2)}$$

where $ORL_{un}$ is the measured ORL for the GRIN rod lens having configuration E. The reflectances (R) for the AR coatings can then be calculated from:

$$R = 10^{-(ORL_m - loss)/10} \qquad \text{Eq (3)}$$

where $ORL_m$ is the measured ORL of the AR coated GRIN rod lens. Table II lists the calculated excess losses and the calculated reflectances for the AR coatings of configurations A and B.

TABLE II

Calculated Antireflection Coating Reflectance

| | Wavelength | | |
|---|---|---|---|
| | 1300 | 1550 | nm |
| Excess Loss | 22.1 | 21.7 | dB |
| Reflectance for Design A | 0.03 | 1.23 | % |
| Reflectance for Design B & D | 0.31 | 0.07 | % |

Significantly, as seen in Table II, even an unbevelled lens exit face having a single minimum AR coating with a low reflectance of 0.03% at the center wavelength limited the optical receiver ORL to 57.2 dB. The bevelled lens exit face configurations (C and D) surpassed this performance, and since the bevelled lens exit face configurations are wavelength independent, the optical receiver ORL is photodetector limited across the entire 950- to 1700-nm wavelength range of the photodetector 50.

The polarization sensitivity of bevelled lens exit face configuration D was measured by varying the input polarization and noting the maximum and minimum photocurrent. The polarization sensitivity (S) was then calculated from:

$$S = 10*\log((I_{pmax} - I_{pmin})/(I_{pmax}))\ (dB) \qquad \text{Eq. (4)}$$

where $I_{Pmax}$ is the maximum photocurrent measured and $I_{pmin}$ is the minimum photocurrent measured. The polarization sensitivity of bevelled lens exit face configuration D was measured to be $\pm 0.015$ dB at $\lambda = 1300$ nm and $\pm 0.027$ dB at $\lambda = 1550$ nm. These values agree well with calculated theoretical values.

Figure 3:
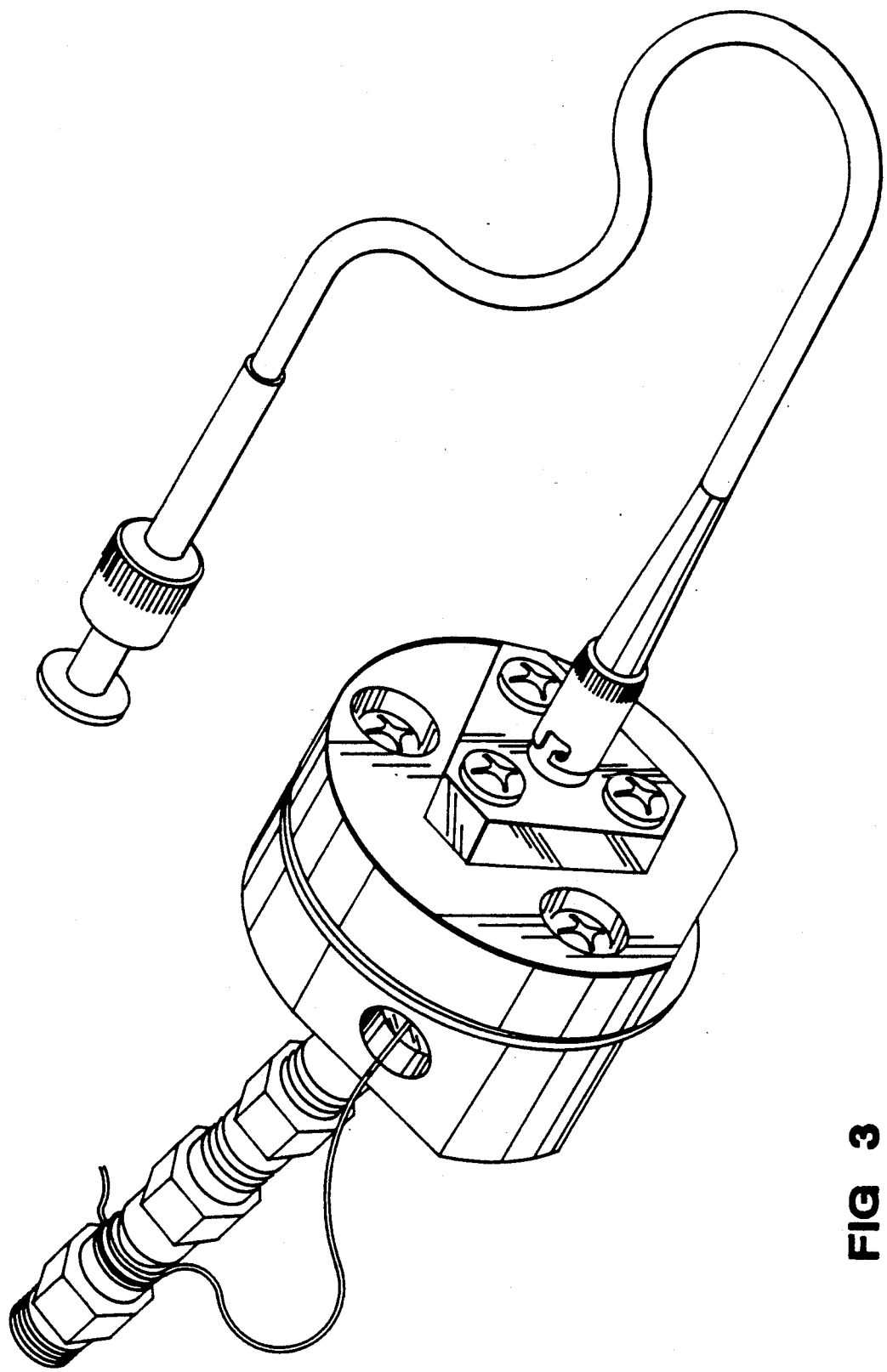
FIG. 3 illustrates a packaged, optical-fiber-pigtailed optical receiver incorporating the GRIN rod lens shown in FIG. 1 and having a DC bias pin and a 20 GHz radio frequency (RF) port.

Finally, bevelled lens exit face configuration C was implemented in a packaged optical receiver, as shown in FIG. 3. The optical receiver shown in FIG. 3 also incorporated a 25-μm small diameter active area photodetector to allow for 20 GHz modulation bandwidth. See, Bowers, J. E., Burrus, C. A., and Mitschke, F., "Millimetre-Waveguide-Mounted InGaAs Photodetectors," Electron. Lett. 22, 633–635 (1986). The small area detector in the packaged optical receiver shown in FIG. 3 exhibited a larger diffuse reflection than the large area photodetector used in the measurements for Table I, which limited the optical receiver ORL to a lower value.

The ORL of the packaged optical receiver shown in FIG. 3 was measured using a Hewlett-Packard Company HP 8702B lightwave component analyzer. This analyzer was used to spatially separate the reflections from the optical fiber connector and the optical receiver components.

Figure 4:
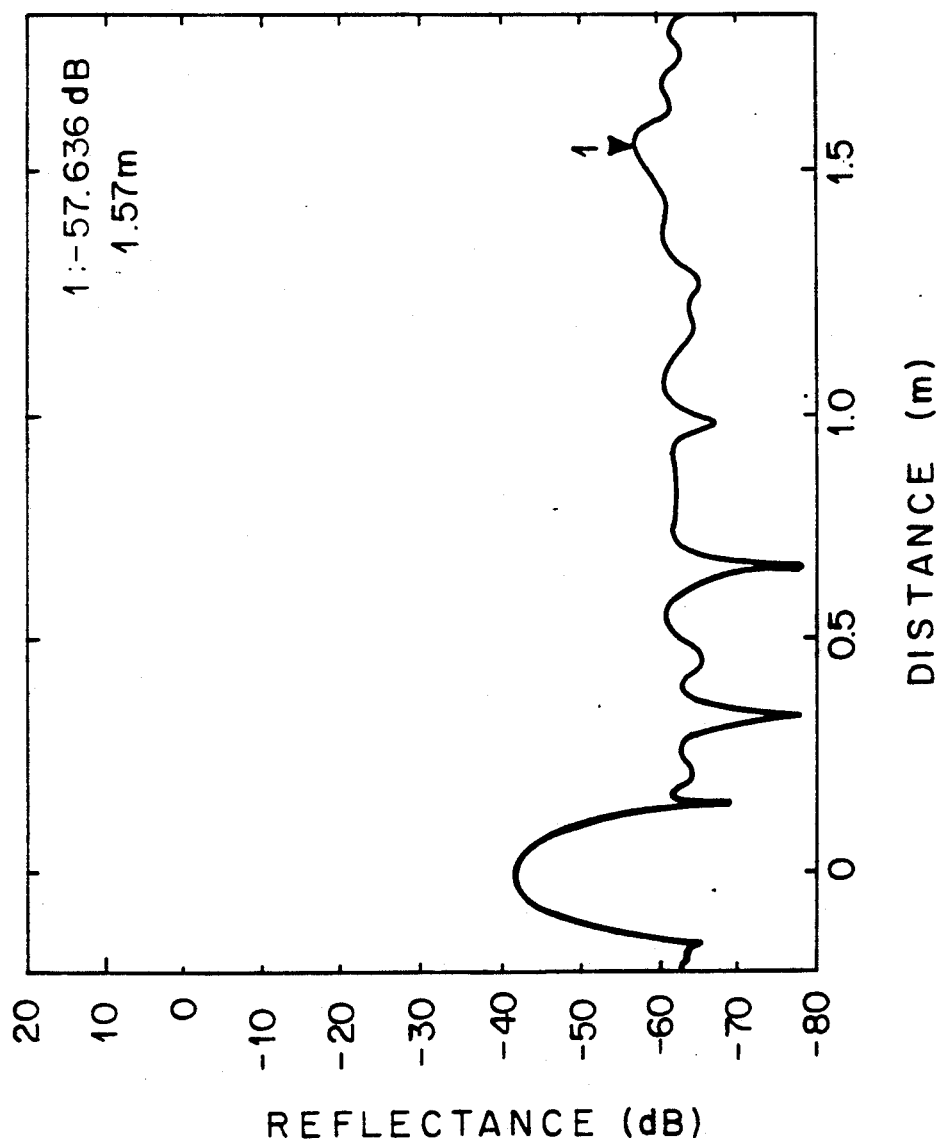
FIG. 4 illustrates an ORL measurement at $\lambda = 1300$ nm for the optical receiver shown in FIG. 3.

FIG. 4 illustrates an ORL measurement at $\lambda = 1300$ nm with the HP 8702B of the packaged optical receiver shown in FIG. 3 incorporating bevelled lens exit face configuration C. The reflection from the fiber connector is at a relative distance of 0.0 m and is −42 dB. The reflection from the optical receiver components, as identified by marker 1, occurs at a distance of 1.57 m from the connector and is −57.6 dB, indicating an ORL of 57.6 dB. At λ =1550 nm, the HP 8702B dynamic range was only 55 dB. No reflection from the receiver components was observed at λ=1550 nm, indicating an ORL>55 dB.

The optical receiver shown in FIG. 1 can advantageously be incorporated into the Hewlett-Packard Company HP 83411A and HP 83410B lightwave receivers. Also, the packaged optical receiver shown in FIG. 3 can serve as an optical front end for the HP 54121, HP 54123, and HP 54124 digital oscilloscopes.

The foregoing description is offered primarily for purposes of illustration. While an embodiment has been disclosed, it will be readily apparent to those skilled in the art that numerous other modifications and variations not mentioned above can still be made without departing from the spirit and scope of the invention as claimed below.

What is claimed is:

1. An optical receiver, comprising:
   an optical launch having an end face;
   a gradient-index (GRIN) rod lens, the GRIN rod lens comprising a rod lens oriented along an optical axis, the GRIN rod lens having an entrance face and an exit face, the entrance face of the GRIN rod lens being bevelled at a first predetermined angle with respect to the optical axis, and the exit face of the GRIN rod lens being bevelled at a second predetermined angle with respect to the optical axis; and
   a photodetector having a receiving surface, the photodetector being tilted at a third predetermined angle with respect to normal incidence;
   the optical launch, GRIN rod lens, and photodetector forming an optical circuit with the end face of the optical launch being opposite the entrance face of the GRIN rod lens and spaced apart therefrom by a first air gap and the exit face of the GRIN rod lens being opposite the receiving surface of the photodetector and spaced apart therefrom by a second air gap.

2. The optical receiver of claim 1 wherein the optical launch is an optical fiber having an end face which is bevelled at a fourth predetermined angle with respect to the optical axis.

3. The optical receiver of claim 2 wherein the optical fiber is a single mode fiber.

4. The optical receiver of claim 2 wherein the first predetermined angle and the fourth predetermined angle are such that with the GRIN rod lens and optical fiber geometric center axes parallel, a predetermined lateral offset provides an on-axis optical path through the GRIN rod lens.

5. The optical receiver of claim 2 wherein the second predetermined angle and the fourth predetermined angle are corresponding angles.

6. The system of claim 5 wherein the second predetermined angle and the fourth predetermined angle are approximately 10.5°.

7. The optical receiver of claim 2 wherein the GRIN rod lens is spaced equidistantly between the optical fiber and photodetector.

8. The optical receiver of claim 2 wherein the first predetermined angle is approximately 8°, the second predetermined angle and the fourth predetermined angle are approximately 10.5°, the third predetermined angle is approximately 22°, and the first and second air gaps are approximately 1.3 mm.

9. The optical receiver of claim 1 wherein the photodetector is a frontside illuminated $In_{0.53}Ga_{0.47}As/InP$ p-i-n photodiode detector.

10. The optical receiver of claim 1 wherein the receiving surface is coated with an anti-reflection coating to reduce reflections at the interface of the second air gap and the receiving surface.

11. The optical receiver of claim 10 wherein the anti-reflection coating is a silicon nitride coating.

12. The optical receiver of claim 1 wherein the second air gap is adjustable so that the GRIN rod lens properly focuses light received from the optical launch onto the receiving surface.

13. The optical receiver of claim 1, further comprising an anti-reflection coating applied to the entrance face to reduce specular reflections and improve optical transmission.

14. The optical receiver of claim 13 wherein the anti-reflection coating is a silicon nitride coating.

15. The optical receiver of claim 1 wherein the second predetermined angle is such that reflection from the exit face of the GRIN rod lens is due only to diffuse reflection and not specular reflection.

16. The optical receiver of claim 1 wherein the GRIN rod lens is a microlens, type H, refractive index $n_0$ (λ=1300 nm)=1.636, $n_0$ (λ=1550 nm)=1.634, diameter 1.8 mm, and 0.27 pitch at λ=1300 nm.

17. The optical receiver of claim 1 wherein the first predetermined angle and the second predetermined angle are different angles.

18. The optical receiver of claim 17 wherein the first predetermined angle is approximately 8° and the second predetermined angle is approximately 10.5°.

* * * * *

UNITED STATES PATENT AND TRADEMARK OFFICE
CERTIFICATE OF CORRECTION

PATENT NO. : 5,221,839
DATED : 06/22/93
INVENTOR(S) : David M. Braun

It is certified that error appears in the above-indentified patent and that said Letters Patent is hereby corrected as shown below:

Col. 2, Line 27, "Optical receiver" should read -- optical receiver --

Col. 2, Line 51, "Hp 54121, Hp 54123" should read -- HP 54121, HP 54123, --

Col. 3, Line 21, "index no" should read -- index $n_0$ --

Col. 3, Line 39, "As shown in Fig." should read -- As shown in Fig. 1 --

Col. 3, Line 58, "illuminated, 60-$\lambda$m" should read -- illuminated, 60-$\mu$m --

Col. 5, Line 3, "photodetector present" should read -- photodetector 50 present, --

Col. 5, Line 17, "57.4 dB at 1300 nm." should read -- 57.4 dB at $\lambda$ = 1300 nm. --

Col. 5, Line 21, "and 1550 nm" should read -- and $\lambda$ = 1550 nm --

Col. 5, Line 38, "receiving surface 5" should read -- receiving surface 52 --

UNITED STATES PATENT AND TRADEMARK OFFICE
CERTIFICATE OF CORRECTION

PATENT NO. : 5,221,839
DATED : 6/22/93
INVENTOR(S) : David M. Braun

It is certified that error appears in the above-indentified patent and that said Letters Patent is hereby corrected as shown below:

Col. 5, Line 61, "calculated using no," should read --calculated using $n_0$,--.

Signed and Sealed this

Fifteenth Day of March, 1994

Attest:

BRUCE LEHMAN

Attesting Officer    Commissioner of Patents and Trademarks